United States Patent [19]
Krinhop

[11] Patent Number: 5,662,449
[45] Date of Patent: Sep. 2, 1997

[54] LIFTING DEVICE FOR BIG ROUND BALES

[76] Inventor: Robert E. Krinhop, 3334 Camp Rd., Manchester, Kans. 67410

[21] Appl. No.: 578,331

[22] Filed: Dec. 26, 1995

[51] Int. Cl.⁶ .................................................. A01D 87/12
[52] U.S. Cl. .................. 414/24.5; 414/111; 414/555; 414/911
[58] Field of Search ............................... 414/24.5, 111, 414/555, 789.7, 546, 703

[56] References Cited

U.S. PATENT DOCUMENTS

| | | |
|---|---|---|
| 3,877,595 | 4/1975 | Edelman . |
| 3,908,846 | 9/1975 | Brummitt ................ 414/24.5 |
| 4,049,140 | 9/1977 | Roose ..................... 414/24.5 |
| 4,053,069 | 10/1977 | Love . |
| 4,090,616 | 5/1978 | Runyan et al. . |
| 4,090,624 | 5/1978 | Krein et al. ............. 414/24.5 |
| 4,095,706 | 6/1978 | Schwien et al. . |
| 4,103,831 | 8/1978 | Laudemann et al. . |
| 4,128,179 | 12/1978 | Gilbert ................... 414/24.5 |
| 4,325,666 | 4/1982 | Chain et al. ............. 414/24.5 |
| 4,527,935 | 7/1985 | Fortenberry ............ 414/24.5 |
| 4,564,325 | 1/1986 | Ackerman ............... 414/24.5 |
| 4,579,497 | 4/1986 | Nine . |
| 4,687,402 | 8/1987 | Zatylny .................. 414/24.5 |
| 4,722,651 | 2/1988 | Antal ..................... 414/24.5 |
| 5,135,343 | 8/1992 | Wigness ................. 414/24.5 |
| 5,281,068 | 1/1994 | Bruce . |

FOREIGN PATENT DOCUMENTS

| 2591062 | 6/1987 | France ................. 414/24.5 |
|---|---|---|
| 2218396 | 11/1989 | United Kingdom ... 414/24.5 |

Primary Examiner—Karen B. Merritt
Assistant Examiner—Douglas Hess
Attorney, Agent, or Firm—Hovey, Williams, Timmons & Collins

[57] ABSTRACT

A lifting device (10) is provided for lifting bales (14) of material. In broad terms, the lifting device (10) comprises a lifting arm assembly (12), and a winch assembly (16). The lifting arm assembly (12) includes a pair of lifting arms (22,24) pivotally coupled with an axle (26), and a closing arm (28). The lifting arms (22,24) are shiftable between spread and drawn positions, and between lowered and raised positions. A linkage assembly (86) intercouples the lifting arms (22,24), and is adapted for shifting the lifting arms (22,24) between the spread and drawn positions. The closing arm (28) is pivotally attached to the axle (26), and is adapted to engage the linkage assembly (86) for shifting the lifting arms (22,24). The closing arm (28) is shiftable between a bale-disengaging position where the lifting arms (22,24) are in the spread position, and a bale-engaging position where the lifting arms (22,24) are in the drawn position. The closing arm (28) is also shiftable toward a bale-transporting position for rotating the axle (26) to shift the lifting arms (22,24) toward the raised position. The winch assembly (16) is adapted for selectively shifting the closing arm (28) between the bale-disengaging and bale-transporting positions.

11 Claims, 4 Drawing Sheets

LIFTING DEVICE FOR BIG ROUND BALES

BACKGROUND OF THE INVENTION

1. Field of the Invention

The present invention relates generally to self-loading and unloading material handling devices adapted for attachment to a vehicle for transportation of a bale of material. More particularly, the lifting device hereof provides an improved structure for selectively engaging, lifting, and transporting a round bale of material.

2. Description of the Prior Art

Presently, in the field of self-loading and unloading material handling devices, round bales of material, such as hay, are lifted for transportation to a use site. The bales are generally cylindrical in shape, and are relatively large and heavy. For example, a typical bale may be up to about six feet in both length land diameter, and weigh up to about 1500 pounds or more. As a result, special equipment must be employed to lift the bales for transportation.

In the past, dedicated bale handlers have been provided for lifting bales for transportation. Examples of such dedicated handlers are described in U.S. Pat. No. 3,877,595 to Edelman, and U.S. Pat. No. 4,053,069 to Love. These references disclose bale lifting trailers configured for attachment to a towing vehicle. The lifting trailers each include a pair of clamping arms pivotally coupled with a rotatable axle. The clamping arms are configured for movement between an open position, and a closed position. A linkage cable intercouples the clamping arms. A winch cable is attached at a midpoint of the linkage cable, and is configured to pull on the linkage cable to close the clamping arms and to lift the bale. Once the bale has been lifted, the towing vehicle is able to transport the bale to a use site where the bale is lowered and placed on the ground.

Such lifting trailers, however, present several problems. For example, such trailers are dedicated solely to the purpose of lifting bales. Lifting trailers are also often relatively lightweight, and are susceptible to early wear.

Systems have also been developed which are designed to be permanently attached to a vehicle, such as a flat bed truck. These vehicle-mounted systems generally include a pair of clamping arms which are pivotally coupled with a structure. The clamping arms are configured for movement between open and closed positions. The structure is mounted to a bed of a vehicle, and is configured for rotation to move the clamping arms between lowered and raised positions.

A pair of clamping arm cylinder assemblies is provided for moving the arms between the closed and open positions for engaging and disengaging a bale, respectively. In addition, a main cylinder assembly is provided for rotating the structure and moving the clamping arms between the lowered and raised positions for lowering and raising the bale, respectively. Such a system, however, is relatively expensive, and requires a heavy duty cylinder assembly for operation. Therefore, a significant, and heretofore unsolved, need exists to provide a lifting device for lifting bales of material having improved bale-handling characteristics, and having a relatively improved and more durable structure.

SUMMARY OF THE INVENTION

The present invention addresses the prior art problems discussed above and provides a distinct advance in the state of the art. More particularly, the lifting device hereof includes improved bale-handling characteristics, and an improved structure for engaging, and lifting bales of material.

A lifting device constructed in accordance with the present invention is provided for lifting big round bales of material, such as hay, straw, and the like. The lifting device broadly includes a lifting arm assembly for engaging and lifting a bale, and a selectively actuatable motive means for selectively operating the lifting arm assembly. In operation, the lifting arm assembly is positioned adjacent to a bale, and the motive means is actuated so that the lifting arm assembly engages and lifts the bale.

The lifting arm assembly includes a rotatable axle, a pair of lifting arms pivotally coupled with the axle, and an operating mechanism. The lifting arms are shiftable between a spread position and a drawn position, and include a bale-impaling point attached at an end of each of the lifting arms. The axle is rotatable about a transverse axis for shifting the lifting arms between a lowered position and a raised position.

A linkage assembly intercouples the lifting arms, and is adapted for shifting the lifting arms between the spread and drawn positions. The linkage assembly is shiftable between a linkage assembly first position where the lifting arms are in the spread position and a linkage assembly second position where the lifting arms are in the drawn position.

The operating mechanism is adapted for shifting the linkage assembly between the linkage assembly first and second positions. The operating mechanism is shiftable between a bale-disengaging position where the linkage assembly is in the linkage assembly first position and a bale-engaging position where the linkage assembly is in the linkage assembly second position.

The operating mechanism is also shiftable into a bale-transporting position. When shifted between the bale-engaging and bale-transporting positions, the operating mechanism rotates the axle, raising the lifting arms from the lowered position toward the raised position. The selectively actuatable motive means is provided for selectively shifting the operating mechanism between the bale-disengaging and bale-transporting positions so that the lifting arms are shifted between the spread and drawn positions to engage a bale, and then raised as the axle is rotated to lift the bale.

A selectively actuatable brake means is provided for preventing rotation of the axle. By preventing rotation of the axle, the lifting arms may be selectively retained in a position, such as the lowered position. It will be appreciated that when positioning the lifting arm assembly adjacent to a bale for engaging and lifting the bale, the brake means is actuated to retain the lifting arms in the lowered position. When the lifting arms are in the lowered position, the bale-impaling points are generally in alignment with a longitudinal axis of the bale. As a result, the bale-impaling points are able to engage the bale generally at a central axis of gravity of the bale as the operating mechanism is shifted toward the bale-engaging position.

A mounting means is provided for mounting the lifting arm assembly and the motive means on a vehicle. The mounting means includes a retractable frame assembly having a vehicle mounting frame adapted for attachment to the vehicle, and a lifting arm assembly mounting structure for supporting the lifting arm assembly.

The mounting frame includes structure for slidably receiving the mounting structure as an axle displacement means for shifting the axle in a direction generally transverse to the transverse axis between an extended position and a retracted position. The axle is shifted into the retracted position when the lifting arms are in the raised position. By retracting the axle, the weight of the bale is shifted in a direction toward the vehicle. As a result, when the lifting device is loaded with a bale, the stability of the vehicle is advantageously increased.

DETAILED DESCRIPTION OF THE PREFERRED EMBODIMENT

Figure 1:
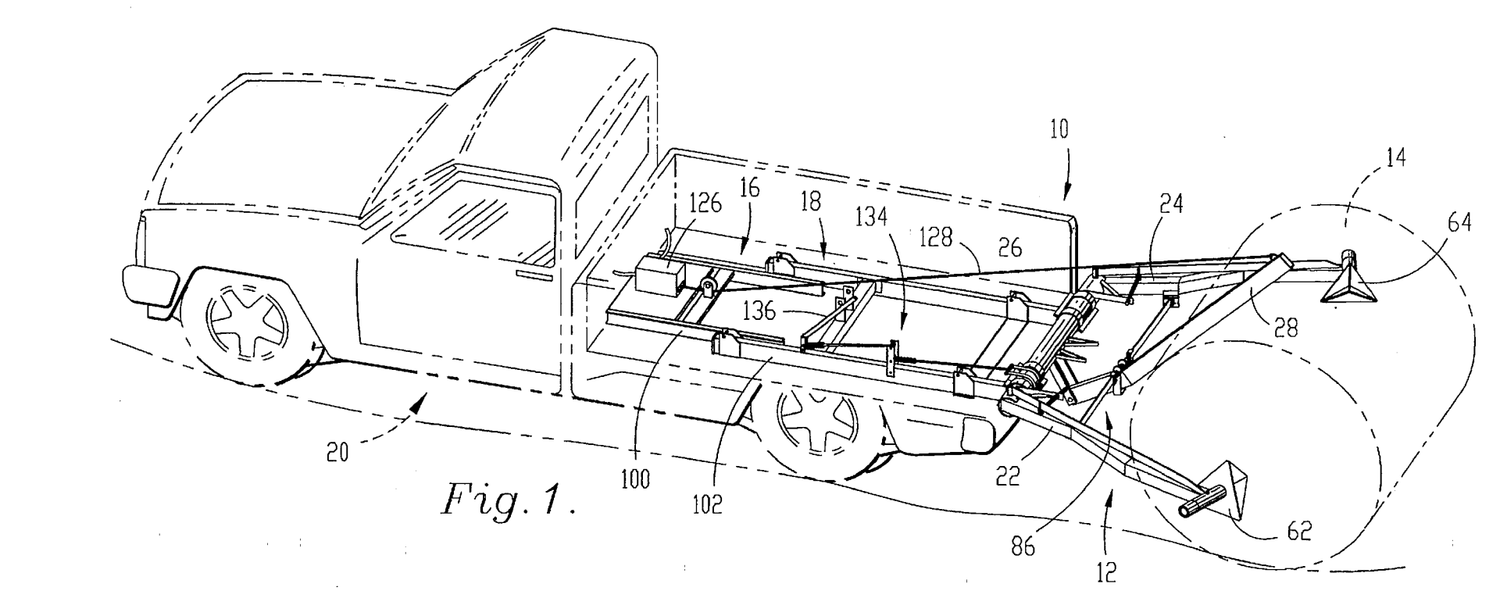
FIG. 1 is a perspective view of a lifting device for bales of material constructed in accordance with a preferred embodiment of the present invention showing a pair of arms in a spread position.

Lifting device 10 constructed in accordance with a preferred embodiment of the present invention is illustrated in FIG. 1. In broad terms, lifting device 10 includes lifting arm assembly 12 operable for engaging and lifting bale 14, selectively actuatable winch assembly 16, and retractable frame assembly 18. Winch assembly 16 is provided as a motive means for selectively operating lifting arm assembly 12 to engage and lift bale 14 for transportation. Frame assembly 18 is provided as a mounting means for mounting lifting arm assembly 12 and winch assembly 16 on vehicle 20.

Lifting arm assembly 12 and retractable frame assembly 18 are preferably constructed of metal. Of course, lifting arm and frame assemblies 12,18 may be constructed of any other suitable material, such as synthetic resin material.

Figures 3, 4:
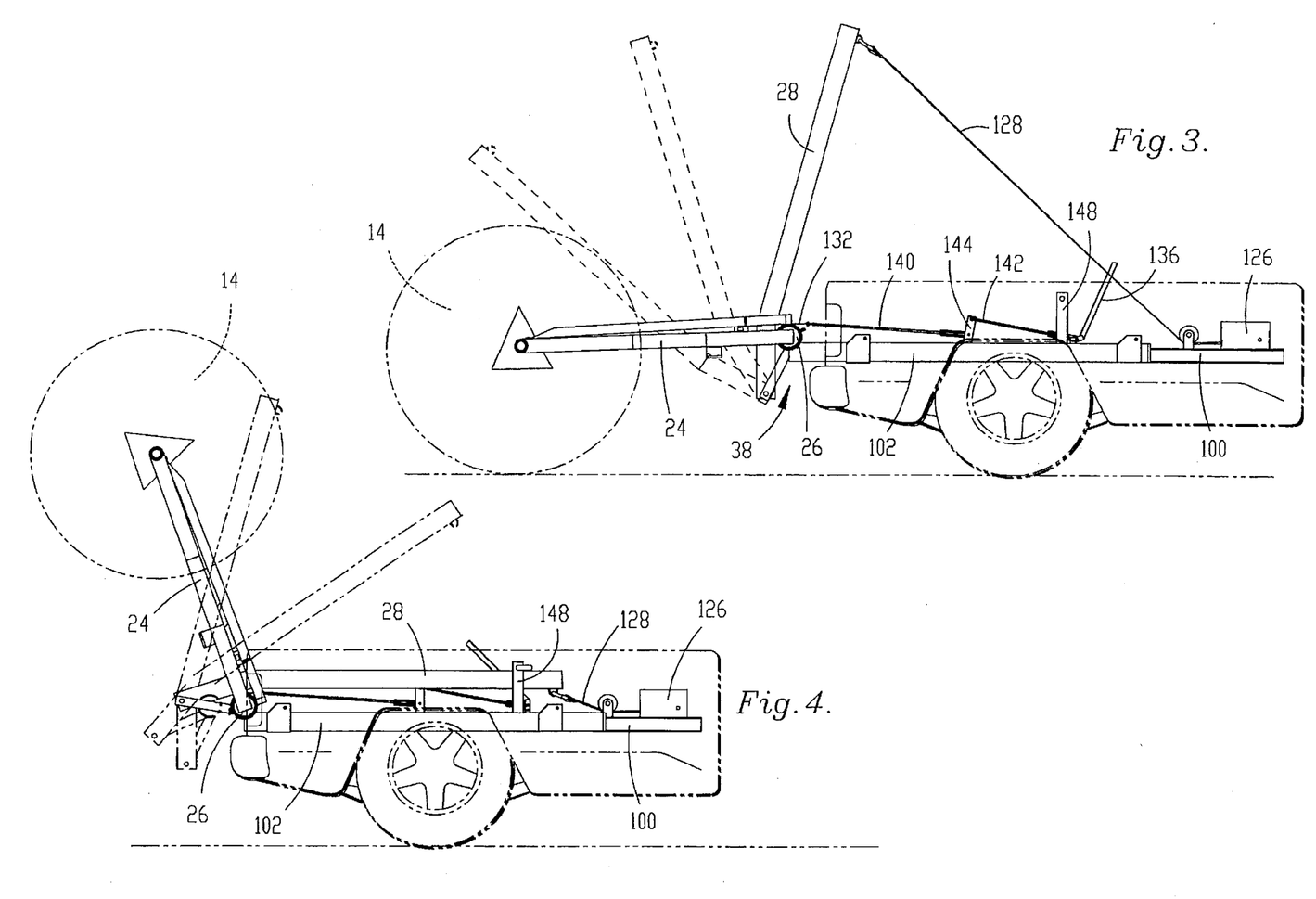
FIG. 3 is an elevational view of the lifting device showing the lifting arms in a drawn position.
FIG. 4 is an elevational view of the lifting device showing the lifting arms in a raised position.
Figures 5, 6, 7:
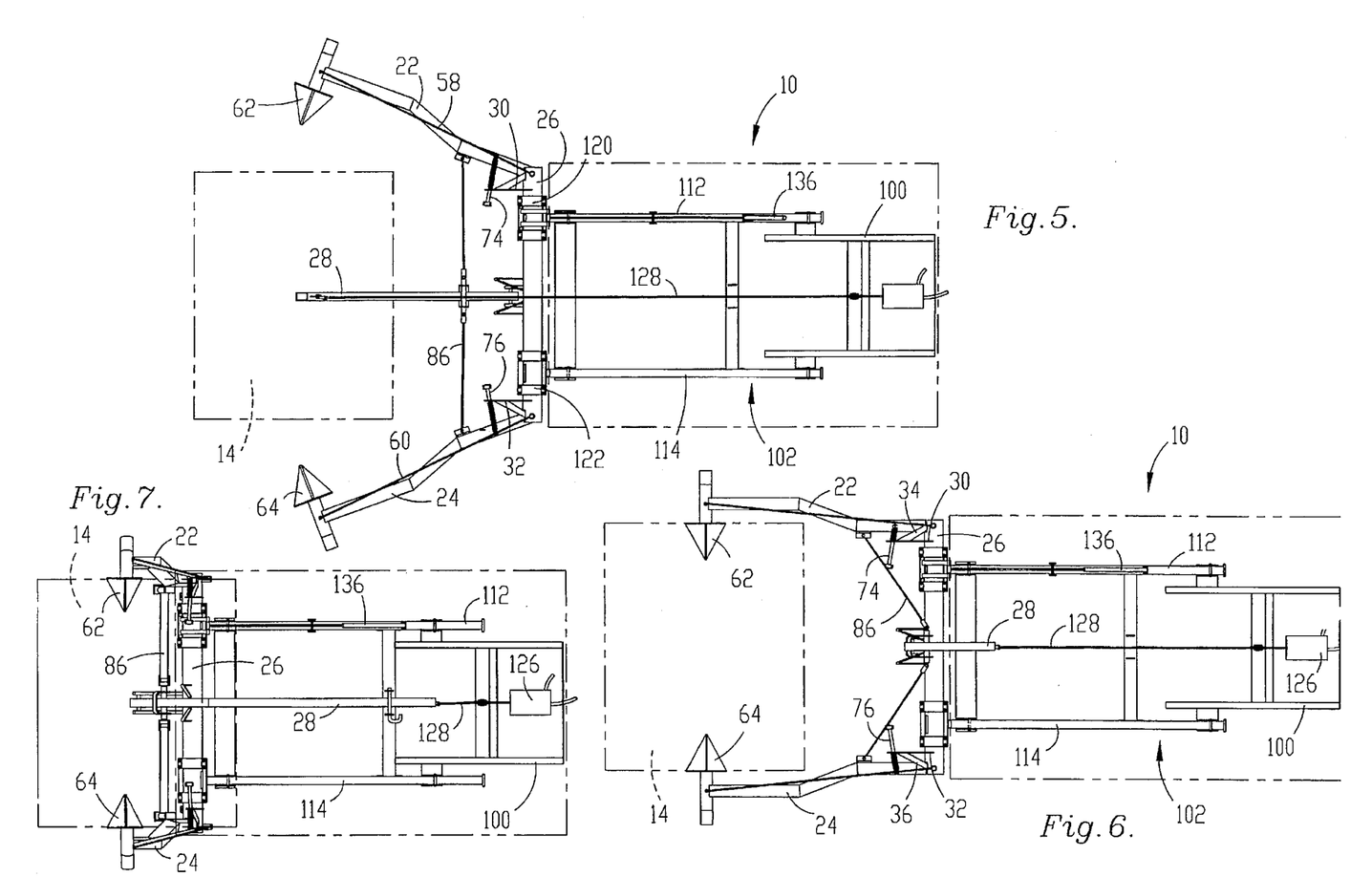
FIG. 5 is a plan view of the lifting device showing the lifting arms in a spread position.
FIG. 6 is a plan view of the lifting device showing the lifting arms in the drawn position.
FIG. 7 is a plan view of the lifting device showing the lifting arms in the raised position.
Figures 8, 9:
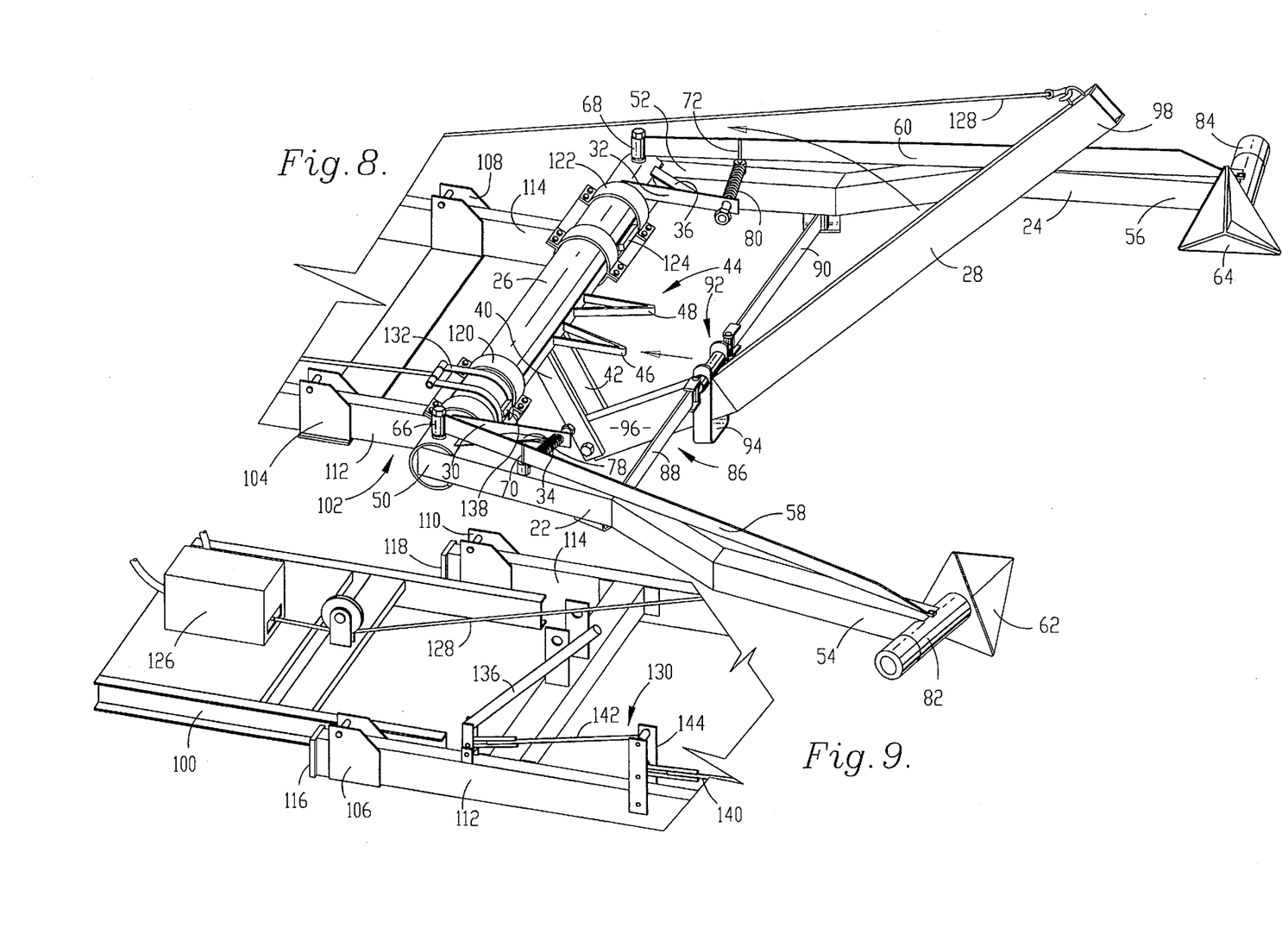
FIG. 8 is a fragmentary, perspective view of a lifting arm assembly of the lifting device.
FIG. 9 is a fragmentary, perspective view of an extendable frame assembly for mounting the lifting arm assembly to a vehicle.

Turning now to FIG. 8, lifting arm assembly 12 includes a pair of lifting arms 22,24 pivotally coupled with rotatable axle 26, and closing arm 28. As best illustrated in FIGS. 5 and 6, lifting arms 22,24 are adapted for pivotally shifting between a spread position and a drawn position to engage bale 14. As shown in FIGS. 3 and 4, axle 26 is rotatable about a transverse axis so that lifting arms 22,24 are additionally shiftable between a lowered position and a raised position to lift bale 14 for transportation. Closing arm 28 is pivotally coupled with axle 26, and is shiftable between a bale-disengaging position and a bale-transporting position. Closing arm 28 is also shiftable into a bale-engaging position between the bale-disengaging and bale-transporting positions.

Axle 26 is sized to be received in a standard-size bed of vehicle 20, such as a pick up truck. Such beds have an interior width dimension of between about 55"–70". Axle 26, therefore, has a length dimension of between about 50–65". Of course axle 26 may be of various other lengths and sizes for use with vehicles having non-standard-sized beds.

Axle 26 includes a tubular wall structure which defines opposed, open ends, and lifting arm receiving slots formed adjacent to and in communication with each open end. Each of the slots is adapted to receive an end of lifting arms 22,24. Additionally, a pair of aligned axle holes (not shown) are formed through the wall structure adjacent to each of the open ends. The pairs of axle holes are configured for receiving lifting arm fastening elements therethrough for coupling lifting arms 22,24 to axle 26.

Biasing brackets 30,32 are mounted on axle 26 adjacent to the respective lifting arm receiving slots. In addition, biasing brackets 30,32 include angled, supporting members 34,36.

Closing arm attachment structure 38 is mounted on axle 26 adjacent to a midpoint of axle 26. Attachment structure 38 includes a pair of spaced-apart attachment elements 40,42. Attachment elements 40,42 are configured for receiving an end of closing arm 28 therebetween. A pair of aligned holes are formed through attachment elements 40,42. The aligned holes are configured for receiving a closing arm fastening element therethrough for retaining closing arm 28 to the axle 26.

Closing arm guiding structure 44 is also mounted on axle 26 adjacent to the axle midpoint. Guiding structure 44 includes a pair of guiding elements 46,48 projecting from axle 26. Guiding elements 46,48 present guiding surfaces which define a channel therebetween for receiving closing arm 28 as closing arm 28 is shifted from the bale-disengaging position toward the bale-engaging position, and for ensuring that closing arm 28 is in proper alignment with attachment structure 38. It will be appreciated that by ensuring that closing arm 28 is in proper alignment with attachment structure 38, closing arm 28 will not impose significant torsional forces on attachment elements 40,42 of attachment structure 38.

Turning again to FIG. 8, lifting arms 22,24 present proximal sections having proximal ends 50,52, intermediate sections, and distal sections having distal ends 54,56. Lifting arms 22,24 include attachment members 58,60 which extend along lifting arms 22,24 between the respective proximal ends 50,52 and distal ends 54,56, and rotatable, bale-impaling points coupled 62,64 with distal ends 54,56. Attachment members 58,60 are fastened to lifting arms 22,24 adjacent to distal ends 54,56 of lifting arms 22,24. Attachment members 58,60 include fastening-element bushing structures 66,68 adjacent to respective proximal ends 50,52 of the lifting arms 22,24, and biasing structure mounts 70,72. Bushing structures 66,68 are in alignment with the attachment holes formed through respective proximal ends 50,52 of lifting arms 22,24.

Coupling lifting arms 22,24 with axle 26 is accomplished by inserting proximal ends 50,52 of lifting arms 22,24 into the respective slots so that bushing structures 66,68 and the corresponding attachment holes are in alignment with the axle holes. A fastening element, such as a bolt, is then inserted through each of the aligned axle holes, the intervening attachment holes, and bushing structures 66,68, and is coupled with a fastener, such as a nut.

Biasing shafts 74,76 and biasing compression springs 78,80 are provided as a means for biasing lifting arms 22,24 toward the spread position. Biasing shafts 74,76 include opposed, mounting and free ends. The mounting end of each shaft 74,76 is adapted to be mounted on respective biasing structure mounts 70,72 of attachment members 58,60. Compression spring 78,80 is telescopically received over respective shafts 74,76. The free ends of shafts 74,76 are adapted to be inserted through a hole formed in each biasing bracket 30,32 so that springs 78,80 span between and are held in compression by the mounting ends of shafts 74,76 and corresponding biasing brackets 30,32. The free ends are adapted to be coupled with a fastener, such as a nut.

Lifting arms 22,24 also include bale-impaling point bushings 82,84 adjacent to respective distal ends 54,56. Bushings 82,84 are provided for rotatably coupling bale-impaling points 62,64 to lifting arms 22,24.

Bale-impaling points 62,64 each include a equilateral triangular-shaped back plate mounted on a shaft (not shown). Three right triangular-shaped fins are mounted on each back plate. Each fin defines a leg edge, and is mounted on the back plate so that the leg edge of each fin is adjacent to the leg edges of the other fins. The shafts are received through the respective point bushings 82,84 so that bale-impaling points 62,64 face each other. The shafts are adapted to be coupled with fastening caps for retaining bale-impaling points 62,64 to point bushings 82,84.

It will be appreciated that various other types of bale-impaling points may alternatively be employed, such as spindles having spiked tips. Additionally, extendable bale-engaging points may be provided so that lifting arm assembly 12 is configured to engage bales of various sizes.

Linkage assembly 86 intercouples lifting arms 22,24 and is configured for shifting lifting arms 22,24 between the spread and drawn positions. Lifting assembly 86 includes a pair of linkage elements 88,90, and roller assembly 92. Linkage elements 88,90 include outboard ends and inboard ends. The outboard ends include points of attachment which are configured to be pivotally coupled with linkage brackets mounted on lifting arms 22,24. Roller assembly 92 is coupled with, and positioned between linkage elements 88,90. Roller assembly 92 includes a roller shaft (not shown) pivotally coupled with the inboard ends of the linkage elements, and a roller element telescopically received over the roller shaft. Additionally, U-shaped, closing arm bracket 94 is coupled with roller assembly 92 and provides a coupling means for slidably coupling closing arm 28 with linkage assembly 86.

Linkage assembly 86 is shiftable between a linkage assembly first position, shown in FIG. 5, where linkage elements 88,90 are generally in linear alignment, and a linkage assembly second position, shown in FIG. 6, where roller assembly 92 is brought relatively close to axle 26, and linkage elements 88,90 are angled relative to each other. It will be appreciated that when linkage assembly 86 is in the first position, the points of attachment are at a maximum separation, and when assembly 86 is in the second position, the points of attachment are at a minimum separation. As a result, lifting arms 22,24 are in the spread position when linkage assembly 86 in the first position, and in the drawn position when linkage assembly 86 is in the second position.

Referring to FIG. 8, closing arm 28 is coupled with closing arm attachment structure 38, and is configured for pivoting about a closing arm axis for shifting linkage assembly 86 between the linkage assembly first and second positions. Closing arm 28 presents proximal portion 96 and distal portion 98. A coupling hole is formed through proximal portion 96. Closing arm 28 is coupled with axle 26 by positioning proximal portion 96 between attachment elements 40,42 so that the coupling hole is in alignment with the aligned holes of attachment elements 40,42, and inserting a fastening element, such as a bolt, through the aligned holes. A fastener, such as a nut, is coupled with the fastening element to retain closing arm 28 between attachment elements 40,42. Additionally, closing arm 28 is received through the U-shaped, closing arm bracket 94.

As illustrated in FIG. 6, closing arm 28 is also configured for shifting into a bale-transporting position. When shifted between the bale-engaging and bale-transporting positions, closing arm 28 rotates axle 26, raising lifting arms 22,24 toward the raised position.

Retractable frame assembly 18 is illustrated in FIGS. 8 and 9. Frame assembly 18 is provided for mounting lifting arm assembly 12 and winch assembly 16 on vehicle 20. Retractable frame assembly 18 includes vehicle mounting frame 100 adapted for attachment to vehicle 20, and lifting arm assembly mounting structure 102 for supporting lifting arm assembly 12 on mounting frame 100.

Mounting frame 100 includes four U-shaped mounting structure brackets 104,106,108,110 for slidably receiving mounting structure 102. A pair of aligned holes are formed through brackets 104,106,108,110 for receiving a retaining pin therethrough. Mounting frame 100 also includes a winch assembly mount for mounting the winch assembly.

Mounting structure 102 includes a pair of spaced-apart leg members 112,114. Leg member 112 is configured to be slidably received through mounting structure brackets 104, 106, while leg member 114 is configured to be slidably received through brackets 108,110. Leg members 112,114 include end caps 116,118 for preventing leg members 112, 114 from inadvertently sliding from mounting structure brackets 104,106,108,110. Mounting structure 102 also includes first and second axle bearing assemblies 120,122 for retaining axle 26 and for supporting lifting arm assembly 12.

It will be appreciated that leg members 112,114 and mounting structure brackets 104,106,108,110 provide an axle displacement means for shifting axle 26 in a direction generally transverse to the transverse axis of the axle 22 between an extended position and a retracted position. Frame assembly 18 is configured to shift axle 22 toward the retracted position as lifting arms 22,24 are shifted toward the raised position. By retracting axle 26, the weight of bale 14 is shifted in a direction toward vehicle 20, increasing the stability of vehicle 20 when lifting device 10 is loaded with bale First axle bearing assembly 120 includes a lower bearing element mounted on mounting structure 102, and a pair of spaced-apart upper bearing elements. Second bearing assembly 122 includes a lower bearing element mounted on mounting structure 102, and a pair of spacedapart upper bearing elements. Stop member 124 is mounted on axle 26 between the upper bearing elements of second bearing assembly 122. Stop member 124 is positioned on axle 26 to limit the rotation of axle 26 about the transverse axis, and to prevent axle 26 from moving relative to bearing assemblies 120,122 in a direction along the transverse axis.

Winch assembly 16 provides a selectively actuatable motive means for selectively shifting closing arm 28 between the bale-disengaging and bale-transporting positions so that lifting arms 22,24 are shifted between the spread and drawn positions, and between the lowered and raised positions. Winch assembly 16 includes winch motor 126 and winch cable 128 coupled with distal portion 98 of closing arm 28. Winch motor 126 is configured for reeling winch cable 128 to shift closing arm 28 toward the bale-transporting position, and for controllably releasing cable 128 for permitting closing arm 28 to shift toward the bale-disengaging position. Winch motor 126 is adapted to be coupled with a power source (not shown) for operation. A winch control (not shown) permits an operator to selectively operate winch assembly 16 for reeling or releasing cable 128.

Brake assembly 130 is provided as a selectively actuatable brake means for selectively preventing rotation of axle 26. As a result, lifting arms 22,24 may be selectively retained in a position, such as the lowered position. Brake assembly 130 includes brake strap 132 having a pair of spaced-apart brake elements, brake linkage assembly 134, and brake lever 136.

Brake strap 132 is adapted to be coupled with first bearing assembly 120, and is positioned between the upper bearing elements of the first bearing assembly. Stop member 138 is mounted on axle 26 between the upper bearing elements of the first bearing assembly, and is positioned on axle 26 to limit the rotation of axle 26 about the transverse axis, and to prevent axle 26 from moving relative to bearing assemblies 120,122 in a direction along the transverse axis. Brake strap 132 is shiftable between an axle-engaging position where the brake elements frictionally engage axle 26, and an axle-rotating position where the brake elements are disengaged from axle 26.

Brake linkage assembly 134 includes first and second brake linkage elements 140,142 coupled with transfer element 144. One end of first linkage element 140 is coupled with brake strap 132, while the other end is coupled with transfer element 144. One end of second linkage element 142 is coupled with transfer element 144, while the other end is coupled with brake lever 136. Transfer element 144 is pivotally coupled with mounting structure 102 between first and second linkage elements 140,142 for transferring movement of one of linkage elements 140,142 to the other of linkage elements 140,142.

Brake lever 136 is pivotally coupled with mounting structure 102 for movement between a locked position, and an unlocked position. Brake lever 136 and linkage assembly 134 cooperably provide a means for shifting brake strap 132 between the axle-engaging position where brake lever 136 is in the locked position, and the axle-rotating position where brake lever 136 is in the unlocked position.

It will be appreciated that when positioning lifting arm assembly 12 adjacent to bale 14 for engaging and lifting bale 14, the brake means may be actuated to retain lifting arms 22,24 in the lowered position. When lifting arms 22,24 are in the lowered position, bale-impaling points 62,64 are in alignment with a longitudinal axis of bale 14. As a result, an operator may be assured that bale-impaling points 62,64 engage bale 14 along a central axis of gravity of bale 14.

Figure 2:
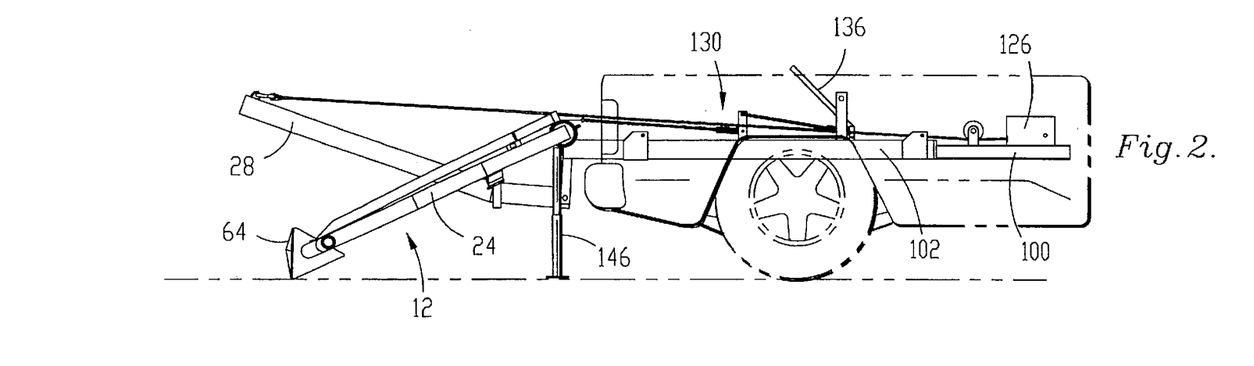
FIG. 2 is an elevational view of the lifting device of FIG. 1.

Prior to use, lifting device 10 is assembled for operation. Vehicle mounting frame 100 is attached to the bed of vehicle 20, and first and second bearing assemblies 120,122 of mounting structure 102 are coupled with lifting arm assembly 12. Mounting structure 102 is supported in part by a pair of stand members 146, shown in FIG. 2, so that leg members 112,114 may be inserted through mounting structure brackets 104,106,108,110. The retaining pins are fitted to the pairs of aligned holes formed in brackets 104,106,108,110 to retain mounting structure 102 to mounting frame 100, and stand members 146 are removed. Winch cable 128 is then coupled with distal portion 98 of closing arm 28.

Once assembled, lifting arm assembly 12 is shifted so that lifting arms 22,24 are in the spread position, and also in the lowered position. Brake lever 136 is moved into the locked position to retain lifting arms 22,24 in the spread and lowered positions. Vehicle 20 is then maneuvered to position bale-impaling points 62,62 adjacent to bale 14, as illustrated in FIG. 5.

In operation, winch motor 126 is actuated to reel cable 128, pivoting closing arm 28 about the closing arm axis, and shifting closing arm 28 from the bale-disengaging position and toward the bale-engaging position, as illustrated in FIGS. 3 and 6. By shifting closing arm 28 toward the bale-engaging position, linkage assembly 86 is shifted from the linkage assembly first position, shown in FIG. 5, toward the linkage assembly second position, shown in FIG. 6. Shifting closing arm 28 thus shifts lifting arms 22,24 arm shifted from the spread position, shown in FIG. 5, toward the drawn position, shown in FIG. 6, for engaging bale 14.

It will be appreciated that, when lifting arms 22,24 are in the drawn position, the distance between distal ends 54,56 is relatively greater than the distance between proximal ends 50,52. As a result, lifting arm assembly 12 is configured for engaging bales which are relatively longer than axle 26. Additionally, lifting device 10 may be fitted to a vehicle having a width dimension smaller than the length of bale 14.

Once lifting arms 22,24 have been shifted into the drawn position, bale-impaling points 62,64 are engaged with bale 14, and brake lever is moved to the unlocked position. Referring again to FIG. 3, closing arm 28 is received in the channel defined by guiding elements 46,48, and is in contact with axle 26 when in the bale-engaging position. Therefore, as shown in FIG. 4, by further reeling winch cable 128, closing arm 28 rotates about the transverse axis of axle 26 toward the bale-transporting position, thereby rotating axle 26. As a result, lifting arms 22,24 are shifted toward the raised position, raising bale 14 for transportation.

While closing arm 28 is shifted toward the bale-transporting position, mounting structure 102 slides forwardly toward vehicle 20 thereby displacing axle 26 in a direction transverse to the transverse axis. Therefore, when closing arm 28 is in the bale-engaging position, lifting arms 22,24 are in the raised position, and axle 26 is in the retracted position. Additionally, distal portion 98 of closing arm 28 is received within retaining structure 148, and a retaining element is coupled with structure 148 to retain closing arm 28 in the bale-engaging position. Advantageously, retaining element 148 allows lifting arms to be securely retained in the raised position without exerting force on winch assembly 130.

Vehicle 20 is thus configured to transport bale 14 to a selected use site where bale 14 may be placed, or unrolled for use. In placing bale 14, the retaining element is uncoupled from retaining structure 148, and winch assembly 16 is actuated to release winch cable 128. It will be appreciated that when bale 14 is raised, the combined center of gravity of lifting arm assembly 12 and bale 14 is reward of axle 26 relative to vehicle 20. As a result, by releasing cable 128, closing arm 28 is shifted toward the bale-engaging position, rotating axle 26 to shift lifting arms 22,24 toward the lowered position where bale 14 rests on the ground.

As axle 26 rotates lowering lifting arms 22,24, attachment structure 38 engages vehicle 20 causing mounting structure 102 and axle 26 to shift toward the extended position. Once lifting arms 22,24 are in the lowered position, brake lever 136 is moved to the locked position thereby retaining lifting arms 22,24 in the lowered position. Closing arm 28 is shifted to the bale-disengaging position where bale-impaling points 62,64 are disengaged from bale 14. Vehicle 20 may then be driven away from bale 14, leaving bale 14 for use.

In unrolling bale 14, lifting arms 22,24 are shifted to the lowered position so that bale 14 rests on the ground as discussed above. With brake lever 136 in the unlocked position, vehicle 20 is driven forwardly causing bale 14 to unroll. Once bale 14 is fully unrolled, closing arm 28 is shifted to the bale-transporting position to raise lifting arms 22,24 so that vehicle 20 may be maneuvered to engage and lift another bale 14, or be parked.

Once the operator is finished moving bales 14, mounting structure 102 and lifting arm assembly 12 may be separated from mounting frame 100 and removed from vehicle 20. As a result, vehicle 20 may be used for other purposes.

In removing mounting structure 102 and lifting arm assembly 12 from vehicle 20, lifting arms 22,24 are shifted past the lowered position so that bale-impaling points 62,64 rest on the ground. Stand members 146 are recoupled with axle 26 to support lifting arm assembly 12 and mounting structure 102. The retaining pins are then removed from brackets 104,106,108,110 so that leg members 112,114 may be lifted from brackets 104,106,108,110. Vehicle 20 is then moved forward, and leg members 112,114 are placed on the ground.

Although the lifting device has been described with reference to the illustrated preferred embodiment, it is noted that variations and changes may be made, and equivalents employed without departing from the scope of the invention as recited in the claims. For example, it will be appreciated that lifting arms having various other shapes and sizes may alternatively be utilized.

What is claimed is:

1. A handling device for handling bales of material comprising:

bale-handling means for engaging and lifting a bale of material, said bale-handling means including an axle, a bale-impaling point, and means for coupling said point with said axle;

selectively actuatable motive means for rotating said axle; and selectively actuatable brake means for preventing rotation of said axle, said brake means including brake actuating means for shifting a brake element between an axle-engaging position where said element frictionally engages said axle and an axle-rotating position where said element is disengaged from said axle, said brake actuating means including a brake lever and a brake linkage assembly intercoupling said brake lever and said brake element, said lever shiftable between a locked position where said brake element is in said axle-engaging position, and an unlocked position where said brake element is in said axle-rotating position.

2. The handling device as set forth in claim 1, said brake means further including means for retaining said brake lever in said locked position.

3. A handling device for handling bales of material comprising:

a lifting arm assembly including:
      an axle rotatable about an axis,
      a pair of spaced apart lifting arms,
      lifting arm coupling means for coupling said lifting arms with said axle for rotation therewith between lowered and raised positions, said lifting arm coupling means further including means for allowing shifting of said lifting arms between spread and drawn positions;

selectively actuatable motive means for rotating said axle about said axis; and mounting means for mounting said lifting arm assembly on a vehicle, said mounting means including axle displacement means for allowing shifting of said axle in a direction generally transverse to said axis between an extended position and a retracted position after shifting said lifting arms to said raised position.

4. The handing device as set forth in claim 3, said mounting means including a retractable frame assembly having a vehicle mounting frame adapted for attachment to the vehicle and a lifting arm assembly mounting structure for supporting said lifting arm assembly, said mounting frame including structure for slidably receiving said mounting structure, said frame assembly shiftable between an extended configuration where said axle is in said extended position and a retracted configuration where said axle is in said retracted position.

5. A lifting device for lifting bales of material comprising:

a rotatable axle;
   a pair of spaced apart lifting arms;
   lifting arm coupling means for coupling said lifting arms with said axle for rotation therewith between lowered and raised positions, said lifting arm coupling means further including means for allowing shifting of said lifting arms between spread and drawn positions;

a linkage assembly shiftable between a linkage assembly first position and a linkage assembly second position, and intercoupling said lifting arms for shifting said arms between said spread and drawn positions in response to said shifting of said linkage assembly between said first and second positions, respectively; and a closing arm shiftable among bale-disengaging, bale-engaging and bale-transporting positions, said closing arm and linkage assembly cooperably presenting means for shifting said linkage assembly from said linkage assembly first position to said linkage assembly second position as said closing arm is shifted from said bale-disengaging position to said bale-engaging position thereby shifting said lifting arms from said spread position to said drawn position, and for rotating said axle as said closing arm is shifted from said bale-engaging position to said bale-transporting position thereby shifting said lifting arms from said lowered position to said raised position.

6. The lifting device as set forth in claim 5, further including biasing means for biasing said lifting arms toward said spread position, said biasing means including a pair of compression springs, each spring being coupled between said axle and one of said lifting arms.

7. The lifting device as set forth in claim 5, said closing arm including a closing arm attachment structure mounted on said axle, said lifting device further including coupling means for slidably coupling said closing arm with said linkage assembly.

8. The lifting device as set forth in claim 7, said coupling means including a bracket attached to said linkage assembly and received around said closing arm so that said closing arm is permitted to move relative to said linkage assembly as said closing arm is shifted between said bale-disengaging and bale-engaging positions.

9. The lifting device as set forth in claim 5, each of said lifting arms including a rotatable, bale-impaling point, each of said points including a back plate and a plurality of fins presenting a right triangular shape with a leg edge, said fins mounted on said back plate so that said leg edges are adjacent each other.

10. The lifting device as set forth in claim 5, further including a closing arm retaining means for retaining said closing arm in said bale-transporting position.

11. The lifting device as set forth in claim 5, said closing arm including a closing arm attachment structure mounted on said axle, said closing arm being pivotally coupled with said mounting structure for pivotal movement about a closing arm axis among said bale-disengaging, bale-engaging and bale-transporting positions.

* * * * *